United States Patent
Kone

(10) Patent No.: US 8,463,294 B2
(45) Date of Patent: Jun. 11, 2013

(54) APPARATUSES AND METHODS FOR REPORTING POSITIONING INFORMATION OF A MOBILE COMMUNICATIONS DEVICE

(75) Inventor: Mamadou Kone, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 13/072,832

(22) Filed: Mar. 28, 2011

(65) Prior Publication Data

US 2011/0244889 A1 Oct. 6, 2011

Related U.S. Application Data

(60) Provisional application No. 61/321,266, filed on Apr. 6, 2010.

(51) Int. Cl.
*H04W 4/02* (2009.01)

(52) U.S. Cl.
USPC .................................... 455/456.3; 455/456.1

(58) Field of Classification Search
USPC .... 455/410, 418, 456.1, 456.3, 525; 370/216, 370/252
See application file for complete search history.

(56) References Cited

U.S. PATENT DOCUMENTS

2011/0176499 A1* 7/2011 Siomina et al. ............... 370/329

FOREIGN PATENT DOCUMENTS

| JP | 2004-158947 A | 6/2004 |
|----|---------------|--------|
| JP | 2008-167381 A | 7/2008 |
| JP | 2009-200614 A | 9/2009 |
| KR | 10-2009-0035612 A | 4/2009 |

OTHER PUBLICATIONS

3GPP TS 36.355 V0.1.02 (2009-1011); 3rd Generation Partnership Project; Technical Specification Group Radio Access Network; Evolved Universal Terrestrial Radio Access (E-UTRA); LTE Positioning Protocol (LPP) (Release 9); pp. 1-99.
Qualcomm Europe: "Addition of Error and Abort Messages to LPP"; 3GPP Draft; R2-096973, 3rd Generation Partnership Project (3GPP), Mobile Competence Centre; 650, Route Des Lucioles; no. Jeju; Nov. 9, 2009; pp. 1-8.
3GPP TS 36.305 V9.1.0 (Dec. 2009); 3rd Generation Partnership Project; Technical Specification Group Radio Access Network; Evolved Universal Terrestrial Radio Access (E-UTRAN); Stage 2 functional specification of User Equipment (UE) positioning in E-UTRANE (Release 9); pp. 1-52.

* cited by examiner

*Primary Examiner* — Sam Bhattacharya
(74) *Attorney, Agent, or Firm* — Birch, Stewart, Kolasch & Birch, LLP

(57) ABSTRACT

A mobile communications device with a wireless module and a controller module is provided. The wireless module performs wireless transmissions and receptions to and from a service network. The controller module receives a positioning information request indicating a plurality of desired positioning information elements from the service network via the wireless module, and determines whether some or all of the desired positioning information elements are not supported. Also, the controller module transmits only a positioning information response indicating the unsupported positioning information elements to the service network via the wireless module, in response to some or all of the desired positioning information elements not being supported.

14 Claims, 5 Drawing Sheets

APPARATUSES AND METHODS FOR REPORTING POSITIONING INFORMATION OF A MOBILE COMMUNICATIONS DEVICE

CROSS REFERENCE TO RELATED APPLICATIONS

This application claims priority of U.S. Provisional Application No. 61/321,266, filed on Apr. 6, 2010, and the entirety of which is incorporated by reference herein.

BACKGROUND OF THE INVENTION

1. Field of the Invention

The invention generally relates to reporting positioning information, and more particularly, to apparatuses and methods for reporting positioning information of a mobile communications device using a normal response without an extra indication.

2. Description of the Related Art

In a typical mobile communication environment, a user equipment (UE) may receive wireless communications services, including voice services and data services, from one or more service networks via cellular stations of the service networks. The wireless communications between the UE and the service networks may be in compliance with various wireless technologies, such as the Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA 2000) technology, Time Division-Synchronous Code Division Multiple Access (TD-SCDMA) technology, Worldwide Interoperability for Microwave Access (WiMAX) technology, Long Term Evolution (LTE) technology, and others. To an increasing extent, the Location-Based Service (LBS) has become a popular data services in the field of wireless communications. The LBS is an information and entertainment service utilizing the wireless access ability to make use of the geographical position of a person, a UE, or an object. For example, the LBS service may include parcel tracking and vehicle tracking services, personalized weather services, location-based games, and mobile commerce when taking the form of coupons or advertising directed at customers based on their current locations, etc.

Taking the LTE technology in compliance with the 3GPP TS 36.305 specification, v.9.3.0 (referred to herein as the 36.305 specification) as an example, a positioning procedure may be initiated by a UE or a service network to communicate a positioning information thereof, including positioning capabilities, assistance data and location information concerning the positioning procedure. When one of a UE and a service network initiates a request for positioning capabilities, assistance data or location information, the other one of the UE and the service network first checks to see if all of the requested information is supported. If so, the other one of the UE and the service network replies with a normal response comprising the requested information. Otherwise, if some or all of the requested information is not supported, the other one of the UE and the service network replies with a normal response comprising the information that is supported, plus an extra indication in which the information not supported is indicated to the originating UE or service network. However, it is not explained specifically what the indication is and how the indication should be delivered.

BRIEF SUMMARY OF THE INVENTION

Accordingly, embodiments of the invention provide apparatuses and methods for reporting positioning information. In one aspect of the invention, a mobile communications device with a wireless module and a controller module is provided. The wireless module performs wireless transmissions and receptions to and from a service network. The controller module receives a positioning information request indicating a plurality of desired positioning information elements from the service network via the wireless module, and determines whether some or all of the desired positioning information elements are not supported. Also, the controller module transmits only a positioning information response indicating the unsupported positioning information elements to the service network via the wireless module, in response to some or all of the desired positioning information elements not being supported.

In another aspect of the invention, a service network with an access node and a control node is provided. The access node performs wireless transmissions and receptions to and from a mobile communications device. The control node receives a positioning assistance data request indicating a plurality of desired positioning assistance data elements from the mobile communications device via the access node, and determines whether some or all of the desired positioning assistance data elements are not supported. Also, the control node transmits only a positioning assistance data response comprising the unsupported positioning assistance data elements to the mobile communications device via the access node, in response to some or all of the desired positioning assistance data elements not being supported.

In another aspect of the invention, a method for reporting positioning information of a mobile communications device is provided. The method comprises the steps of receiving, by the mobile communications device, a positioning information request indicating a plurality of desired positioning information elements from a service network, determining, by the mobile communications device, whether some or all of the desired positioning information elements are not supported, and transmitting, by the mobile communications device, only a positioning information response comprising the unsupported positioning information elements to the service network, in response to some or all of the desired positioning information elements not being supported.

In another aspect of the invention, a method for reporting positioning information of a service network is provided. The method comprises the steps of receiving, by the service network, a positioning assistance data request indicating a plurality of desired positioning assistance data elements from a mobile communications device, determining, by the service network, whether some or all of the desired positioning assistance data elements are not supported, and transmitting, by the service network, only a positioning assistance data response comprising the unsupported positioning assistance data elements to the mobile communications device, in response to some or all of the desired positioning assistance data elements not being supported.

Other aspects and features of the present invention will become apparent to those with ordinarily skill in the art upon review of the following descriptions of specific embodiments of apparatuses and methods for reporting positioning information during a positioning procedure.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The 3GPP specifications are used to teach the spirit of the invention, and the invention is not limited thereto.

Regarding the extra indication for the information not supported, it may be deemed as another LTE Positioning Protocol (LPP) message according to the 36.305 specification. However, the invention proposes to only use the normal response to carry the information of the extra indication, and thus, the extra indication may be omitted to save network resources and improve efficiency of the positioning procedure.

Figure 1:
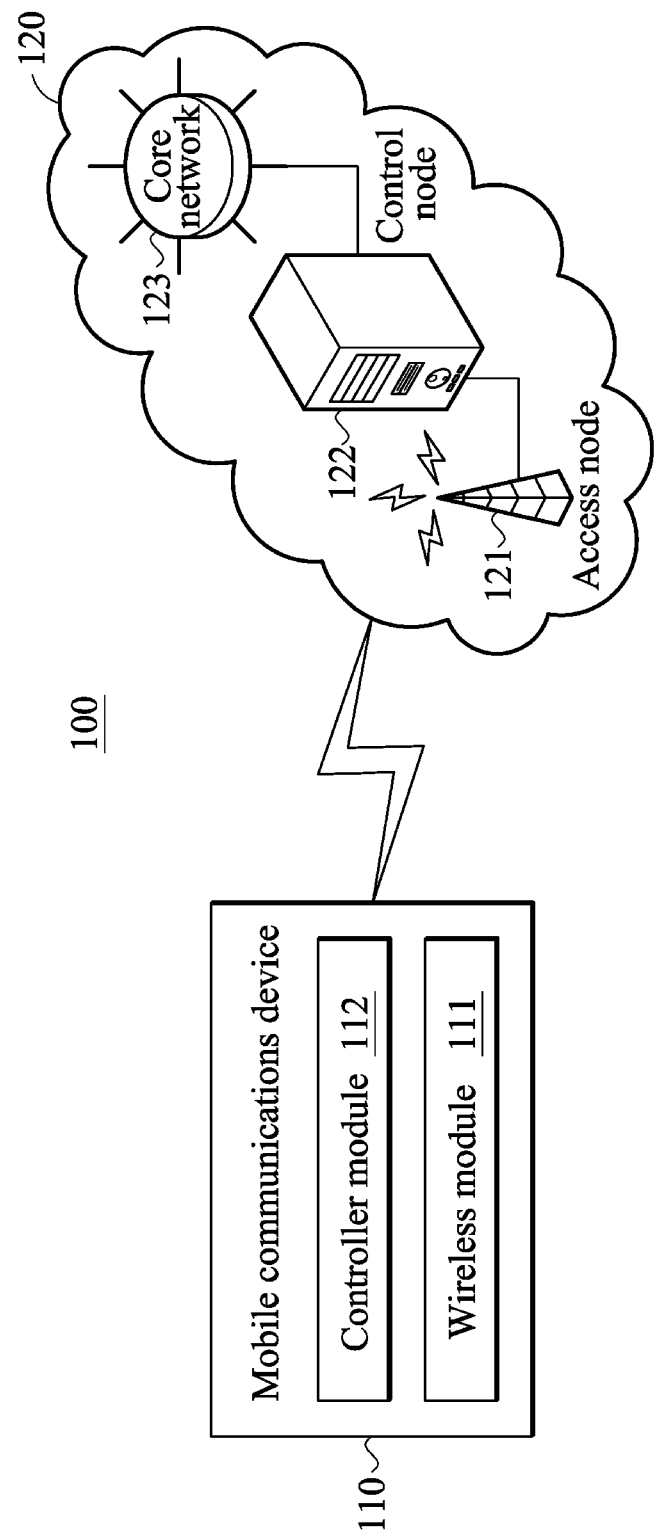
FIG. 1 is a block diagram illustrating a mobile communication environment according to an embodiment of the invention.

FIG. 1 is a block diagram illustrating a mobile communication environment according to an embodiment of the invention. In the mobile communications environment 100, the mobile communications device 110 is wirelessly connected to the service network 120 for obtaining wireless communications services. The service network 120 comprises an access node 121, a control node 122, and a core network 123. Though the control node 122 and the core network 123 are shown to be two separate components of the service network 120, the control node 122 and the core network 123 may be incorporated into one single component, and the invention is not limited thereto. The access node 121 generally refers to a cellular station or base station which provides wireless access to the UEs in its radio coverage. The mobile communication device 110 comprises a wireless module 111 for performing the functionality of wireless transmissions and receptions to and from the service network 120. To further clarify, the wireless module 111 may comprise a baseband unit (not shown) and a radio frequency (RF) unit (not shown). The baseband unit may contain multiple hardware devices to perform baseband signal processing, including analog to digital conversion (ADC)/digital to analog conversion (DAC), gain adjusting, modulation/demodulation, encoding/decoding, and so on. The RF unit may receive RF wireless signals, and convert the received RF wireless signals to baseband signals, which are processed by the baseband unit, or receive baseband signals from the baseband unit and convert the received baseband signals to RF wireless signals, which are later transmitted. The RF unit may also contain multiple hardware devices to perform radio frequency conversion. For example, the RF unit may comprise a mixer to multiply the baseband signals with a carrier oscillated in the radio frequency of the wireless communications system, wherein the radio frequency may be 900 MHz, 1900 MHz, or 2100 MHz utilized in WCDMA systems, or may be 900 MHz, 2100 MHz, or 2.6 GHz utilized in LTE systems, or others depending on the radio access technology (RAT) in use. Also, the mobile communication device 110 comprises a controller module 112 for controlling the operation of the wireless module 111 and other functional components, such as a display unit and/or keypad serving as the MMI (man-machine interface), a storage unit storing the program codes of applications or communication protocols, or others. In one embodiment, the service network 120 may be an LTE network and the mobile communications device 110 may be a UE in compliance with the 36.305 specification and other related specifications of the LTE technology. Alternatively, the mobile communications device 110 may be a UE supporting multiple wireless technologies, such as the GSM technology, the WCDMA technology, the CDMA 2000 technology, the TD-SCDMA technology, and the WiMAX technology, and the invention is not limited thereto.

Figure 2:
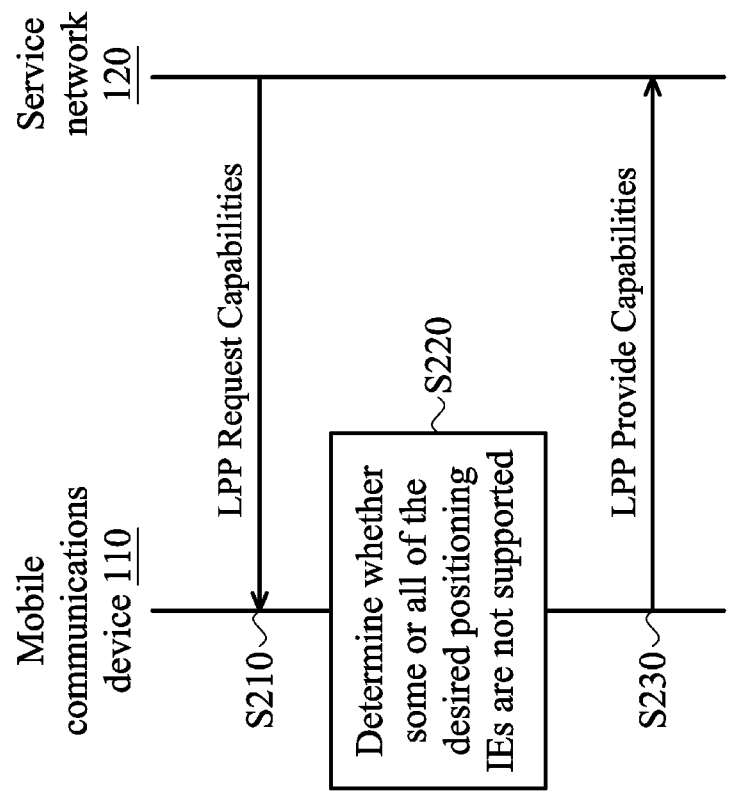
FIG. 2 is a message sequence chart illustrating a positioning capability transfer initiated by a service network according to an embodiment of the invention.

To be more specific, the controller module 112 controls the wireless module 111 for performing a positioning procedure with the service network 120. The positioning procedure may be initiated by the mobile communications device 110 or the service network 120 to communicate the positioning information thereof, including positioning capabilities, assistance data and location information concerning the positioning procedure. FIG. 2 is a message sequence chart illustrating a positioning capability transfer initiated by a service network according to an embodiment of the invention. To begin, the controller module 112 receives an LPP Request Capabilities message from the service network 120 via the wireless module 111, wherein the LPP Request Capabilities message indicates at least one desired positioning information elements (IEs) (step S210). To further clarify, the positioning IEs may each refer to the ability of the mobile communications device 110 to support a particular position method defined for the LPP, a particular aspect of a particular position method, or a common feature to a multiple position method. That is, the mobile communications device 110 may support one or more of a plurality of position methods, including Autonomous Global Positioning System (GPS)/Global Navigation Satellite Systems (GANSS), Assisted-GPS (A-GPS)/Assisted-GANSS (A-GANSS) SET Assisted, A-GPS (A-GANSS) SET Based, Enhanced Cell ID (ECID), Enhanced Observed Time Difference (E-OTD), and Observed Time Difference of Arrival (OTDOA), depending on the RAT in use. Next, the controller module 112 determines whether some or all of the desired positioning IEs are not supported (step S220). If so, the controller module 112 transmits only an LPP Provide Capabilities message to the service network 120 via the wireless module 111 to end the positioning procedure, wherein the LPP Provide Capabilities message indicates the unsupported positioning IEs (step S230). Specifically, the unsupported positioning IEs may be indicated by the present parameters of the LPP Provide Capabilities message according to the 36.305 specification and the 3GPP TS 36.355 specification, v.9.3.0 (referred to herein as the 36.355 specification), and reference may be made thereto for the detailed descriptions of the present parameters of the LPP Provide Capabilities message. In addition to the unsupported positioning IEs, if there are any other positioning IEs that are supported, the LPP Provide Capabilities message may comprise the supported positioning IE(s). Otherwise, if all of the desired positioning IEs are supported, the controller module 112 may transmit an LPP Provide Capabilities message comprising the desired positioning IEs to the service network 120 via the wireless module 111. In another embodiment, if all of the desired positioning IEs are not supported, the controller module 112 just discards or ignores the LPP Request Capabilities message instead of transmitting the LPP Provide Capabilities message to the service network 120.

Figure 3:
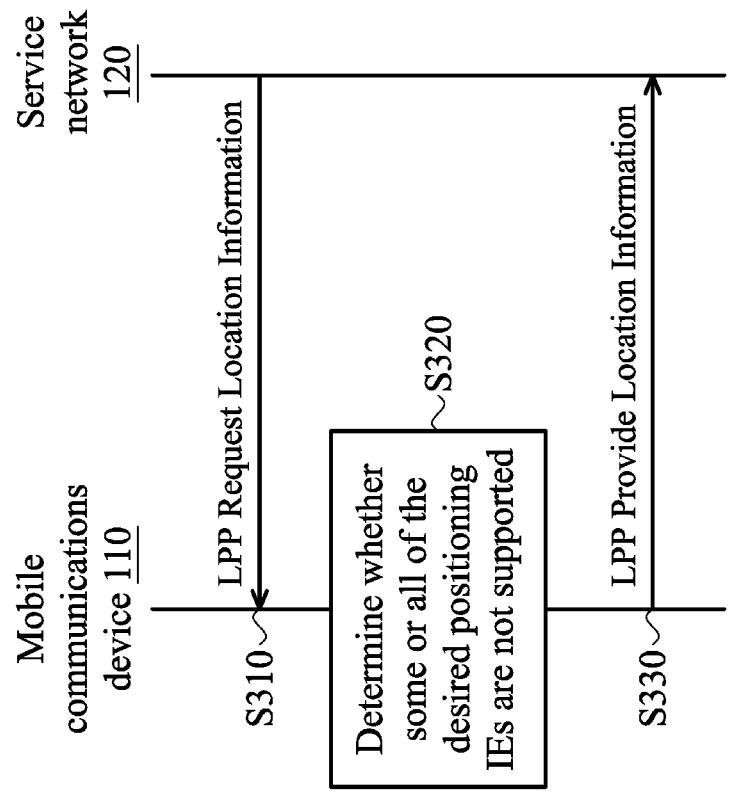
FIG. 3 is a message sequence chart illustrating a location information transfer initiated by a service network according to an embodiment of the invention.

FIG. 3 is a message sequence chart illustrating a location information transfer initiated by a service network according to an embodiment of the invention. To begin, the controller module 112 receives an LPP Request Location Information message from the service network 120 via the wireless module 111, wherein the LPP Request Location Information message indicates at least one desired positioning IEs (step S310). In this embodiment, the positioning IEs may each refer to an actual position estimate, or a value used in position calculations, such as a radio measurement result or a positioning measurement result. Subsequently, the controller module 112 determines whether some or all of the desired positioning IEs are not supported (step S320). If so, the controller module 112 transmits only an LPP Provide Location Information message to the service network 120 via the wireless module 111 to end the positioning procedure, wherein the LPP Provide Location Information message comprises the unsupported positioning IEs (step S330). To further clarify, the unsupported positioning IEs may be indicated by the present parameters of the LPP Provide Location Information message according to the 36.305 specification and the 36.355 specification, and reference may be made thereto for the detailed descriptions of the present parameters of the LPP Provide Location Information message. For example, if the unsupported positioning IEs correspond to the OTDOA position method, the unsupported positioning IEs may be indicated by the "OTDOA-Error" IE in the LPP Provide Location Information message. Specifically, the "OTDOA-TargetDeviceErrorCauses" IE in the "OTDOA-Error" IE may be used to specify the error reasons. If the unsupported positioning IEs correspond to the A-GNSS position method, the unsupported positioning IEs may be indicated by the "A-GNSS-Error" IE in the LPP Provide Location Information message. Specifically, the "A-GNSS-TargetDeviceErrorCauses" IE in the "A-GNSS-Error" IE may be used to specify the error reasons. If the unsupported positioning IEs correspond to the ECID position method, the unsupported positioning IEs may be indicated by the "ECID-Error" IF in the LPP Provide Location Information message. Specifically, the "ECID-TargetDeviceErrorCauses" IE in the "ECID-Error" IE may be used to specify the error reasons. If all of the desired positioning IEs are not supported, the LPP Provide Location Information message may contain the "CommonIEsProvideLocationInformation" IE and the error reason may be indicated with the "LocationError" IE therein. Besides the unsupported positioning IEs, if there are any other positioning IEs that are supported, the LPP Provide Location Information message may comprise the supported positioning IE(s). Otherwise, if all of the desired positioning IEs are supported, the controller module 112 may transmit an LPP Provide Location Information message comprising the desired positioning IEs to the service network 120 via the wireless module 111.

Figure 4:
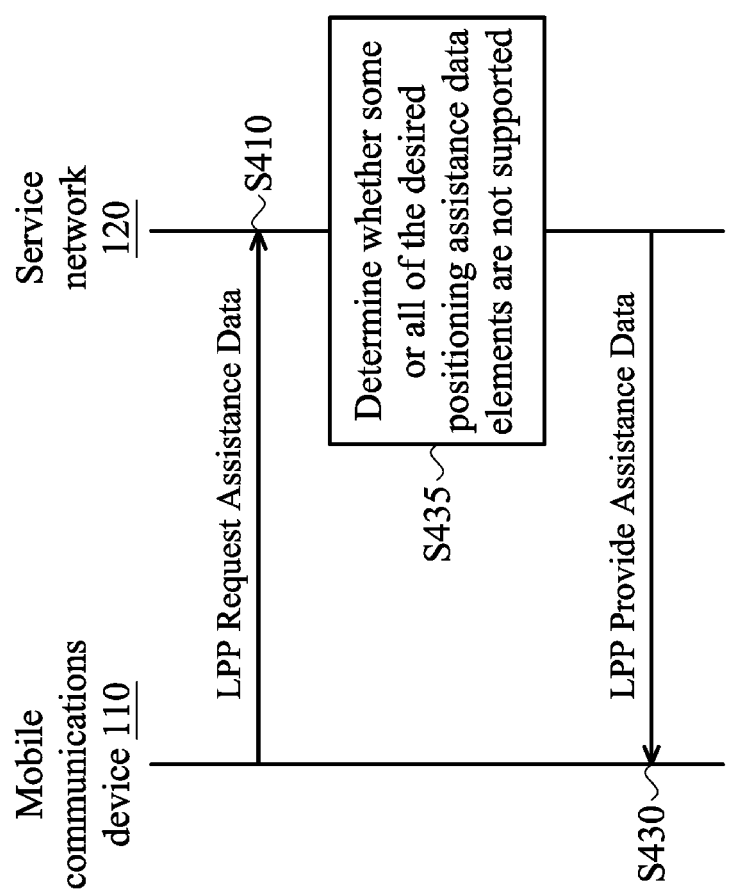
FIG. 4 is a message sequence chart illustrating an assistance data transfer initiated by a mobile communications device according to an embodiment of the invention.

FIG. 4 is a message sequence chart illustrating an assistance data transfer initiated by a mobile communications device according to an embodiment of the invention. To begin, the controller module 112 transmits an LPP Request Assistance Data message to the service network 120 via the wireless module 111, wherein the LPP Request Assistance Data message indicates at least one desired positioning assistance data elements (step S410). In this embodiment, the positioning assistance data elements may each refer to an assistance data needed for a particular position method applied in the mobile communications device 110. When receiving the LPP Request Assistance Data message, the service network 120 first determines whether some or all of the desired positioning assistance data elements are not supported (step S420), and if so, transmits only an LPP Provide Assistance Data message to the mobile communications device 110 to end the positioning procedure, wherein the LPP Provide Assistance Data message comprising the unsupported positioning assistance data elements (step S430). To further clarify, the unsupported positioning assistance data elements may be indicated by the present parameters of the LPP Provide Assistance Data message according to the 36.305 specification and the 36.355 specification, and reference may be made thereto for the detailed descriptions of the present parameters of the LPP Assistance Data message. For example, if the unsupported positioning IEs correspond to the OTDOA position method, the unsupported positioning IEs may be indicated by the "OTDOA-Error" IE in the LPP Provide Assistance Data message. Specifically, the "OTDOA-LocationServerErrorCauses" IE in the "OTDOA-Error" IE may be used to specify the error reasons. If the unsupported positioning IEs correspond to the A-GNSS position method, the unsupported positioning IEs may be indicated by the "A-GNSS-Error" IE in the LPP Provide Assistance Data message. Specifically, the "A-GNSS-LocationServerErrorCauses" IE in the "A-GNSS-Error" IE may be used to specify the error reasons. Besides the unsupported positioning IEs, if there are any other positioning IEs that are supported, the LPP Provide Assistance Data message may comprise the supported positioning IE(s). Otherwise, if all of the desired positioning IEs are supported, the service network 120 may transmit an LPP Provide Assistance Data message comprising the desired positioning assistance data elements to the mobile communications device 110.

It is noted that, in FIGS. 2 to 4, the requested side during the positioning procedures only replies to the requesting side with a normal response indicating the unsupported positioning IEs, without employing an extra indication message.

Figure 5:
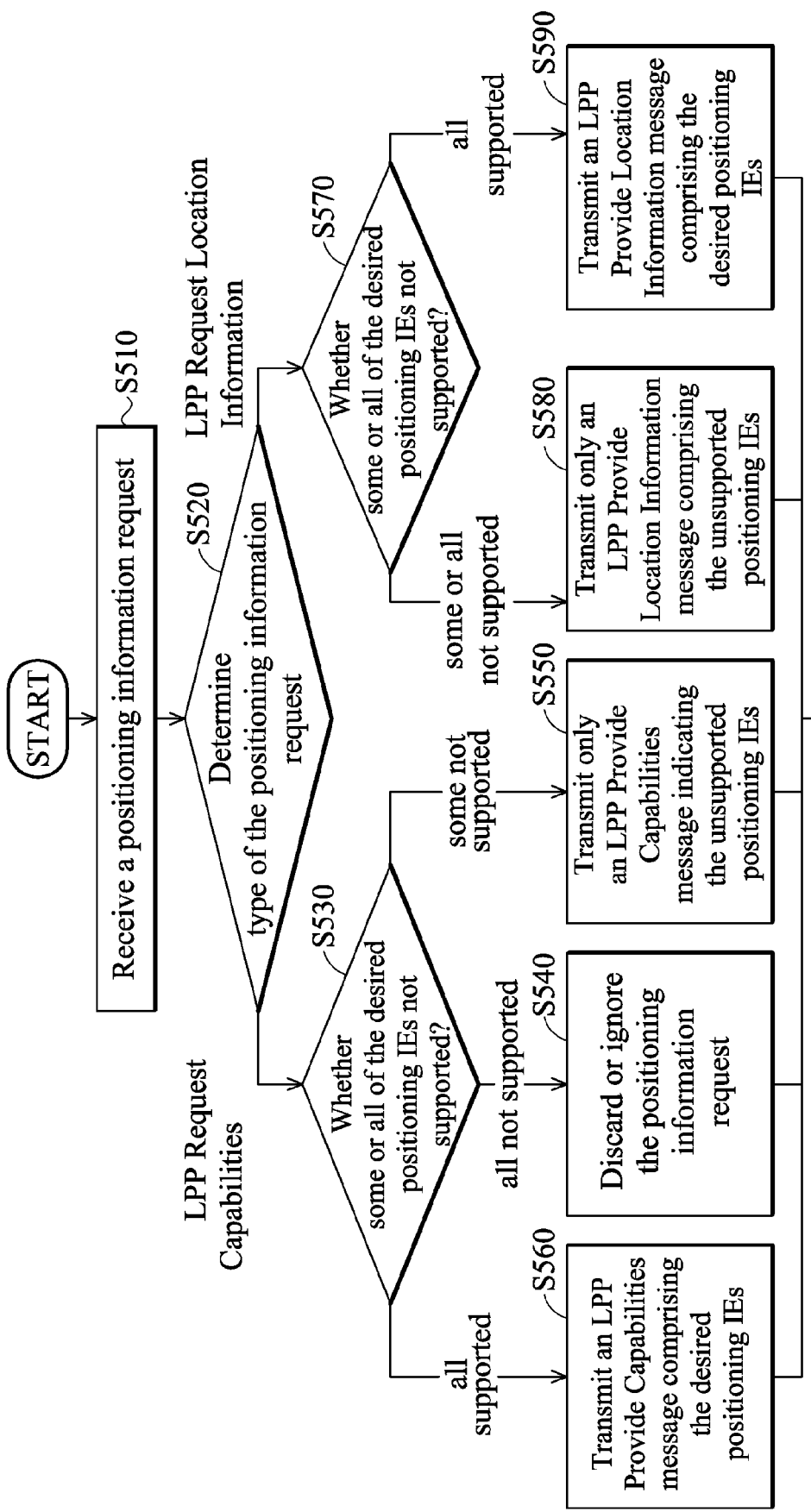
FIG. 5 is a flow chart illustrating a method for reporting positioning information of a mobile communications device according to an embodiment of the invention.

FIG. 5 is a flow chart illustrating a method for reporting positioning information of a mobile communications device according to an embodiment of the invention. The mobile communications device is wirelessly connected to a service network for a positioning procedure. The positioning procedure is performed for the mobile communications device and the service network to communicate the positioning information therebetween, including positioning capabilities and location information concerning the positioning procedure. In this embodiment, the positioning procedure is initiated by the service network. Taking the mobile communications environment 100 as an example, to begin, the mobile communications device 110 receives a positioning information request indicating a plurality of desired positioning IEs from the service network 120 (step S510). The positioning information request may be an LPP Request Capabilities message, and the desired positioning IEs may each refer to the ability of the mobile communications device 110 to support a particular position method defined for LPP, a particular aspects of a particular position method, or a common feature to multiple position method. Alternatively, the positioning information request may be an LPP Request Location Information message, and the desired positioning IEs may each refer to an actual position estimate, or a value used in position calculations, such as a radio measurement result or a positioning measurement result. In response to the positioning information request, the mobile communications device 110 first determines whether the positioning information request is an LPP Request Capabilities message or an LPP Request Location Information message (step S520). If the positioning information request is an LPP Request Capabilities message, the mobile communications device 110 then determines whether some or all of the desired positioning IEs are not supported (step S530). If all of the desired positioning IEs are not supported, the mobile communications device 110 just discards or ignores the positioning information request to end the positioning procedure (step S540). This is because the service network 120 is usually aware if the mobile communications device 110 supports at least a positioning method before requesting for its capability. Otherwise, if some of the desired positioning IEs are not supported, the mobile communications device 110 transmits only an LPP Provide Capabilities message indicating the unsupported positioning IEs to the service network 120 (step S550). In addition to the indication of the unsupported positioning IEs, the LPP Provide Capabilities message may further comprise other positioning IE(s) that is supported by the mobile communications device 110. Furthermore, if all of the desired positioning IEs are supported, the mobile communications device 110 transmits an LPP Provide Capabilities message comprising the desired positioning IEs to the service network 120 (step S560).

Subsequent to step S520, if the positioning information request is an LPP Request Location Information message, the mobile communications device 110 then determines whether some or all of the desired positioning IEs are not supported (step S570). If some or all of the desired positioning IEs are not supported, the mobile communications device 110 then transmits an LPP Provide Location Information message comprising the unsupported positioning IEs to the service network 120 (step S580). In addition to the indication of the unsupported positioning IEs, the LPP Provide Location Information message may further comprise other positioning IE(s) that is supported by the mobile communications device 110. Otherwise, if all of the desired positioning IEs are supported, the mobile communications device 110 transmits an LPP Provide Location Information message comprising the desired positioning IEs to the service network 120 (step S590). Regarding the indication of the unsupported positioning IEs in the LPP Provide Capabilities message or the LPP Provide Location Information message, reference may be made to the 36.305 specification and the 36.355 specification for detailed descriptions. Note that the unsupported positioning IEs are indicated to the service network 120 by only an LPP Provide Capabilities message or an LPP Provide Location Information message, without an extra indication message.

Figure 6:
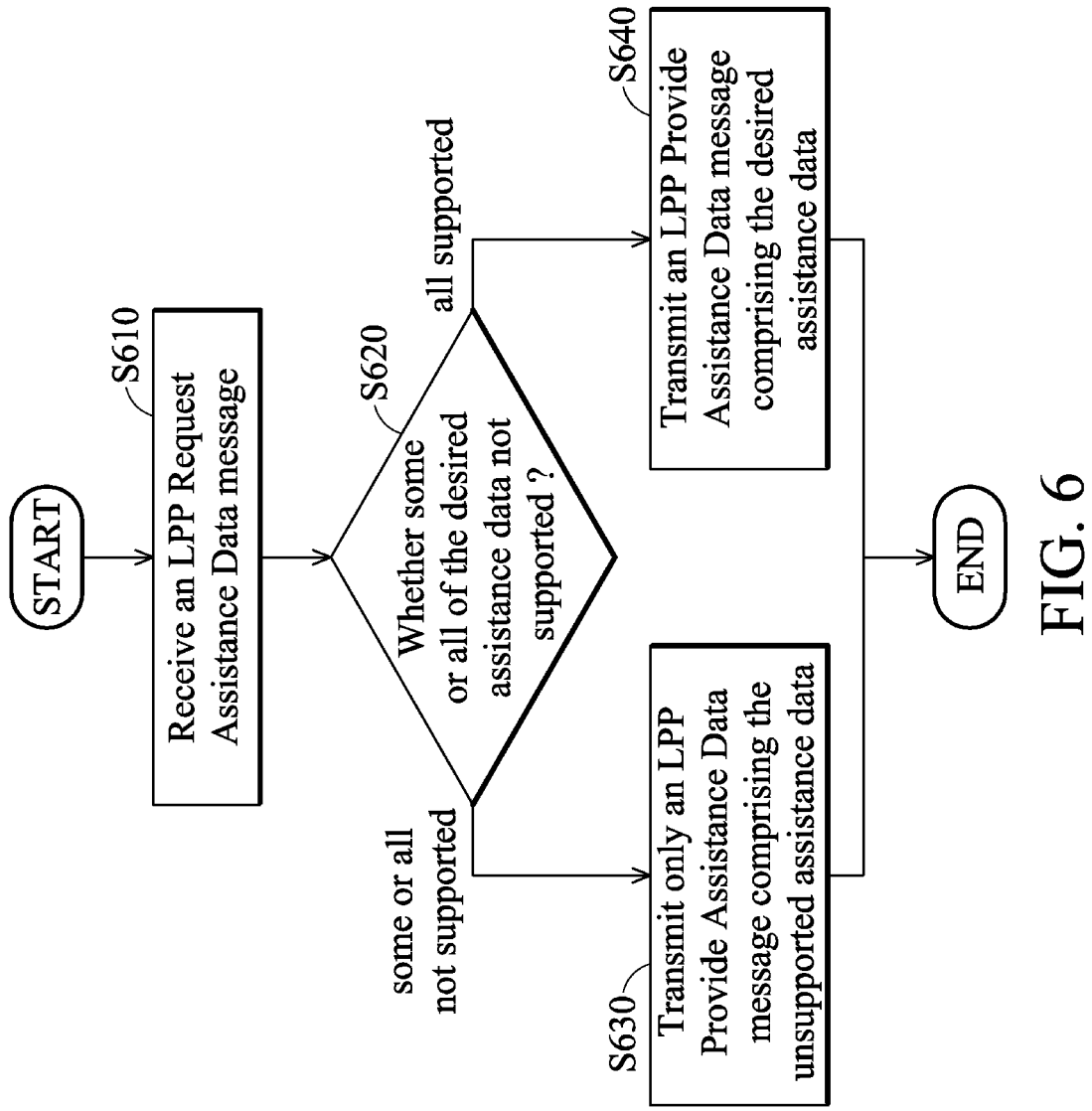
FIG. 6 is a flow chart illustrating a method for reporting positioning information of a service network according to an embodiment of the invention.

FIG. 6 is a flow chart illustrating a method for reporting positioning information of a service network according to an embodiment of the invention. The service network provides wireless access to a mobile communications device for a positioning procedure. The positioning procedure is performed for the mobile communications device and the service network to communicate the positioning information therebetween, such as assistance data concerning the positioning procedure. In this embodiment, the positioning procedure is initiated by the mobile communications device. Taking the mobile communications environment 100 as an example, to begin, the service network 120 receives an LPP Request Assistance Data message indicating a plurality of desired assistance data from the mobile communications device 110 (step S610). Next, the service network 120 determines whether some or all of the desired assistance data are not supported (step S620). If some or all of the desired assistance data are not supported, the service network 120 transmits only an LPP Provide Assistance Data message comprising the unsupported assistance data to the mobile communications device 110 (step S630). In addition to the indication of the unsupported assistance data, the LPP Provide Assistance Data message may further comprise other assistance data that is supported by the mobile communications device 110. Regarding the indication of the unsupported assistance data, reference may be made to the 36.305 specification and the 36.355 specification for detailed descriptions. Otherwise, if all of the desired assistance data are supported, the service network 120 transmits an LPP Provide Assistance Data message comprising the desired assistance data to the mobile communications device 110 (step S640). Note that the unsupported assistance data is indicated to the mobile communications device 110 by only an LPP Provide Assistance Data message, without an extra indication message.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A mobile communications device, comprising:
   a wireless module performing wireless transmissions and receptions to and from a service network; and
   a controller module receiving a positioning information request indicating a plurality of desired positioning information elements from the service network via the wireless module, determining whether some or all of the desired positioning information elements are not supported, and transmitting only a positioning information response comprising the unsupported positioning information elements to the service network via the wireless module, in response to some or all of the desired positioning information elements not being supported.

2. The mobile communications device of claim 1, wherein the positioning information request is an LTE (Long Term Evolution) Positioning Protocol (LPP) Request Location Information message, and the positioning information response is an LPP Provide Location Information message.

3. The mobile communications device of claim 1, wherein the controller module further transmits a positioning assistance data request indicating a plurality of desired positioning assistance data elements to the service network via the wireless module, and the service network replies to the positioning assistance data request with only a positioning assistance data response indicating that some or all of the desired positioning assistance data elements are not supported.

4. The mobile communications device of claim 3, wherein the positioning assistance data request is an LPP Request Assistance Data message and the positioning assistance data response is an LPP Provide Assistance Data message.

5. The mobile communications device of claim 1, wherein the wireless transmissions and receptions to and from the service network are in compliance with a communication protocol specified for a Long Term Evolution (LTE) technology.

6. A service network, comprising:
   an access node performing wireless transmissions and receptions to and from a mobile communications device; and
   a control node receiving a positioning assistance data request indicating a plurality of desired positioning assistance data elements from the mobile communications device via the access node, determining whether some or all of the desired positioning assistance data elements are not supported, and transmitting only a positioning assistance data response comprising the unsupported positioning assistance data elements to the mobile communications device via the access node, in response to some or all of the desired positioning assistance data elements not being supported.

7. The service network of claim 6, wherein the positioning assistance data request is an LPP Request Assistance Data message and the positioning assistance data response is an LPP Provide Assistance Data message.

8. The service network of claim 6, wherein the wireless transmissions and receptions to and from the mobile communications device are in compliance with a communication protocol specified for a Long Term Evolution (LTE) technology.

9. A method for reporting positioning information of a mobile communications device, comprising:
   receiving, by the mobile communications device, a positioning information request indicating a plurality of desired positioning information elements from a service network;
   determining, by the mobile communications device, whether some or all of the desired positioning information elements are not supported; and
   transmitting, by the mobile communications device, only a positioning information response comprising the unsupported positioning information elements to the service network, in response to some or all of the desired positioning information elements not being supported.

10. The method of claim 9, wherein the positioning information request is an LPP Request Location Information message, and the positioning information response is an LPP Provide Location Information message.

11. The method of claim 9, wherein the mobile communications device and the service network are in compliance with a communication protocol specified for a Long Term Evolution (LTE) technology.

12. A method for reporting positioning information of a service network, comprising:
   receiving, by the service network, a positioning assistance data request indicating a plurality of desired positioning assistance data elements from a mobile communications device;
   determining, by the service network, whether some or all of the desired positioning assistance data elements are not supported; and
   transmitting, by the service network, only a positioning assistance data response comprising the unsupported positioning assistance data elements to the mobile communications device, in response to some or all of the desired positioning assistance data elements not being supported.

13. The method of claim 12, wherein the positioning assistance data request is an LPP Request Assistance Data message and the positioning assistance data response is an LPP Provide Assistance Data message.

14. The method of claim 12, wherein the service network and the mobile communications device are in compliance with a communication protocol specified for a Long Term Evolution (LTE) technology.

* * * * *